United States Patent
Ogita

(10) Patent No.: US 8,341,696 B2
(45) Date of Patent: Dec. 25, 2012

(54) IMAGE FORMING APPARATUS, IMAGE FORMING METHOD, AND STORAGE MEDIUM

(75) Inventor: Seiya Ogita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1004 days.

(21) Appl. No.: 12/360,209

(22) Filed: Jan. 27, 2009

(65) Prior Publication Data

US 2009/0199270 A1    Aug. 6, 2009

(30) Foreign Application Priority Data

Feb. 1, 2008    (JP) ................................. 2008-023046

(51) Int. Cl.
G06F 7/04 (2006.01)
G06F 15/173 (2006.01)

(52) U.S. Cl. ............................................ 726/2; 709/225
(58) Field of Classification Search ....................... 726/2
See application file for complete search history.

(56) References Cited

U.S. PATENT DOCUMENTS

| 7,219,231 B2 * | 5/2007 | Cossel et al. ............... 713/168 |
| 7,380,121 B2 * | 5/2008 | Nomura et al. ............. 713/166 |
| 7,693,990 B2 * | 4/2010 | Tsujimoto ................... 709/225 |
| 2005/0060564 A1 * | 3/2005 | Murakami et al. ............ 713/200 |
| 2008/0141148 A1 | 6/2008 | Ogita |

FOREIGN PATENT DOCUMENTS

| JP | 2003-345753 | 12/2003 |
| JP | 2005-335215 | 12/2005 |

* cited by examiner

Primary Examiner — Nathan Flynn
Assistant Examiner — Abdullah Almanun
(74) Attorney, Agent, or Firm — Oblon, Spivak, McClelland, Maier & Neustadt, L.L.P.

(57) ABSTRACT

A disclosed image forming apparatus includes an authentication information unit including login information of a user and an authentication key; an authentication key providing unit including the authentication key; functional units; and a functional-unit authentication unit including authentication information of the functional units and a first verification unit configured to determine whether the functional units are authenticated. Each of the functional units includes an authentication key obtaining unit for obtaining the authentication key from the authentication key providing unit if the first verification unit determines that the functional unit is authenticated. The authentication information unit further includes a second verification unit for determining whether the authentication key obtained by the authentication key obtaining unit matches the authentication key in the authentication information unit, and a login information providing unit for providing the login information to the functional unit if the second verification unit determines that the authentication keys match.

9 Claims, 9 Drawing Sheets

IMAGE FORMING APPARATUS, IMAGE FORMING METHOD, AND STORAGE MEDIUM

BACKGROUND OF THE INVENTION

1. Field of the Invention

A certain aspect of the present invention relates to an image forming apparatus, an image forming method, and a storage medium.

2. Description of the Related Art

Many multifunction copiers and Web sites have a function to provide services only to successfully authenticated users. Also, there are known technologies for skipping an authentication process for users who are logged in by retaining the authentication information (login information) of the users in a system.

For example, patent document 1 discloses a technology for determining whether a user is authenticated and dynamically changing the user interface for the user based on the determination result.

Meanwhile, in a complex system like a multifunction copier, function screens for executing applications such as copy and facsimile applications and setting screens such as a system setting screen and an initial setting screen may be created based on different software frameworks (e.g., programming languages). Those applications created based on different software frameworks are executed using different browsing programs corresponding to the software frameworks.

Assume that a user who has logged in from an application created based on a software framework switches to another application created based on a different software framework. Even in this case, it is preferable to be able to omit the authentication process for the user who is already logged in. For this purpose, it is necessary to enable the applications created based on different software frameworks to share the authentication information of the user.

[Patent document 1] Japanese Patent Application Publication No. 2003-345753

However, allowing all applications installed in a system such as a multifunction copier to share the authentication information of users may result in allowing even an unknown application to use the authentication information and therefore may cause a security problem.

SUMMARY OF THE INVENTION

Aspects of the present invention provide an image forming apparatus, an image forming method, and a storage medium that solve or reduce one or more problems caused by the limitations and disadvantages of the related art.

According to an aspect of the present invention, an image forming apparatus includes an authentication information unit including login information indicating whether a user is logged into the image forming apparatus and an authentication key used to obtain the login information; an authentication key providing unit including the authentication key; functional units implementing functions of the image forming apparatus; and a functional-unit authentication unit including authentication information indicating whether the functional units are authenticated and a first verification unit configured to determine whether the functional units are authenticated based on the authentication information. Each of the functional units includes an authentication key obtaining unit configured to obtain the authentication key from the authentication key providing unit if the first verification unit determines that the functional unit is authenticated. The authentication information unit also includes a second verification unit configured to determine whether the authentication key obtained by the authentication key obtaining unit of the functional unit matches the authentication key in the authentication information unit, and a login information providing unit configured to provide the login information to the functional unit if the second verification unit determines that the authentication keys match.

Another aspect of the present invention provides an image forming method in an image forming apparatus. The image forming apparatus includes an authentication information unit including login information indicating whether a user is logged into the image forming apparatus and an authentication key used to obtain the login information; an authentication key providing unit including the authentication key; functional units implementing functions of the image forming apparatus; and a functional-unit authentication unit including authentication information indicating whether the functional units are authenticated. The image forming method includes a first verification step, performed by the functional-unit authentication unit, of determining whether a given one of the functional units is authenticated based on the authentication information; an authentication key obtaining step, performed by the given one of the functional units, of obtaining the authentication key from the authentication key providing unit if the given one of the functional units is determined to be authenticated in the first verification step; a second verification step, performed by the authentication information unit, of determining whether the authentication key obtained in the authentication key obtaining step matches the authentication key in the authentication information unit; and a login information providing step, performed by the authentication information unit, of providing the login information to the given one of the functional units if the authentication keys are determined to be identical in the second verification step.

Still another aspect of the present invention provides a storage medium storing program code for causing an image forming apparatus to perform an image forming method. The image forming apparatus includes an authentication information unit including login information indicating whether a user is logged into the image forming apparatus and an authentication key used to obtain the login information; an authentication key providing unit including the authentication key; functional units implementing functions of the image forming apparatus; and a functional-unit authentication unit including authentication information indicating whether the functional units are authenticated. The image forming method includes a first verification step, performed by the functional-unit authentication unit, of determining whether a given one of the functional units is authenticated based on the authentication information; an authentication key obtaining step, performed by the given one of the functional units, of obtaining the authentication key from the authentication key providing unit if the given one of the functional units is determined to be authenticated in the first verification step; a second verification step, performed by the authentication information unit, of determining whether the authentication key obtained in the authentication key obtaining step matches the authentication key in the authentication information unit; and a login information providing step, performed by the authentication information unit, of providing the login information to the given one of the functional units if the authentication keys are determined to be identical in the second verification step.

DESCRIPTION OF THE PREFERRED EMBODIMENTS

Preferred embodiments of the present invention are described below with reference to the accompanying drawings.

<Operations of Image Forming Apparatus>

Figure 1:
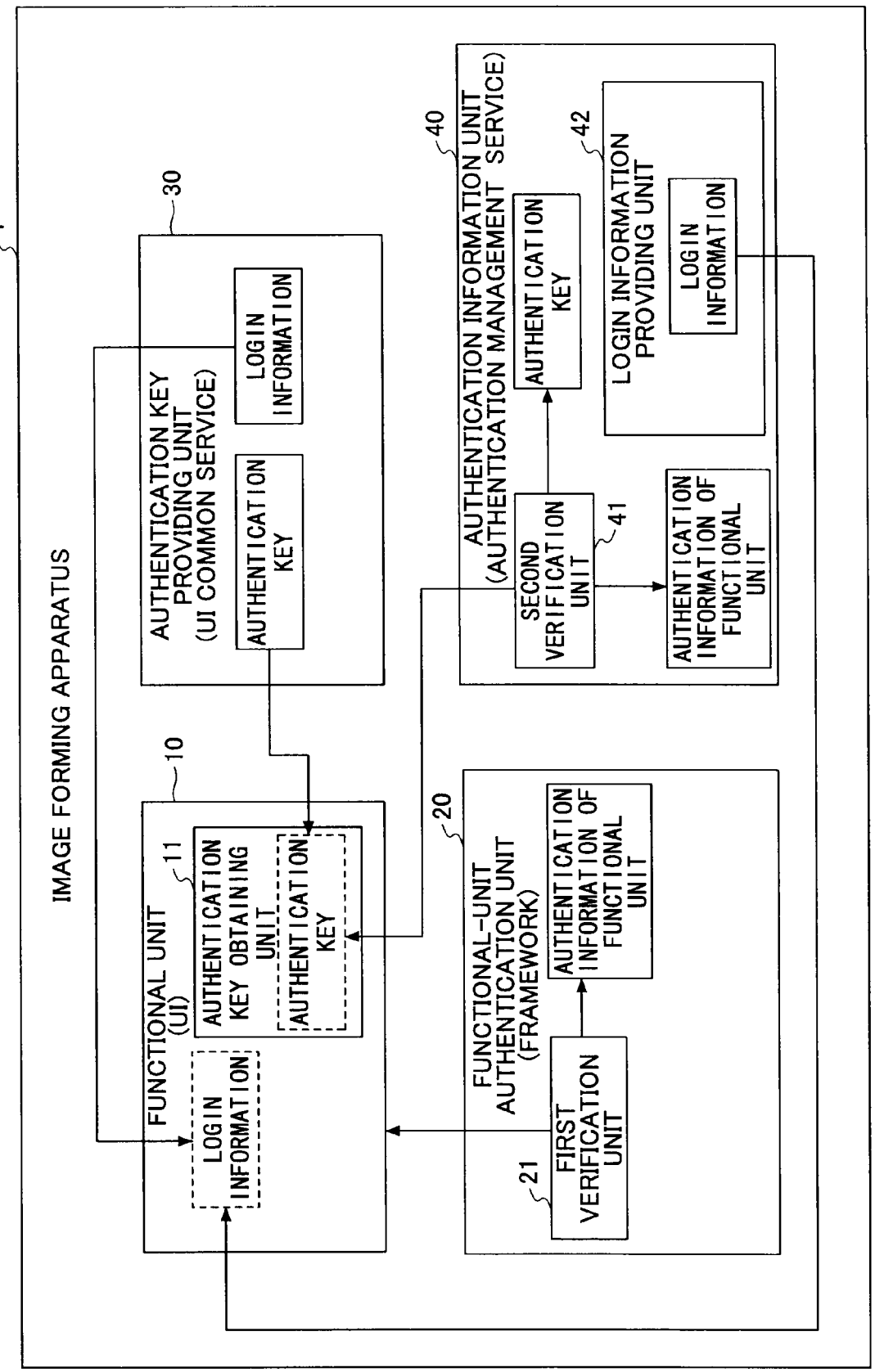
FIG. 1 is a drawing illustrating basic operations of an image forming apparatus according to an embodiment of the present invention.

FIG. 1 is a drawing illustrating basic operations of an image forming apparatus 1 according to an embodiment of the present invention.

The image forming apparatus 1 includes plural functional units 10, a functional-unit authentication unit 20, an authentication key providing unit 30, and an authentication information unit 40.

The functional units 10 are application programs that provide functions of the image forming apparatus 1.

Each of the function units 10 (may be referred to simply as the functional unit 10 for descriptive purposes) includes an authentication key obtaining unit 11 that requests the functional-unit authentication unit 20 or the authentication key providing unit 30 to provide an authentication key.

The authentication key obtaining unit 11 can obtain an authentication key from the authentication key providing unit 30 only if the functional-unit authentication unit 20 determines that the functional unit 10 is authenticated. The authentication key providing unit 30 includes the authentication key. In one case, the functional-unit authentication unit 20 receives the authentication key from the authentication key providing unit 30 and provides the received authentication key to the functional unit 10. In another case, the functional unit 10 receives the authentication key directly from the authentication key providing unit 30.

In still another case, the authentication key obtaining unit 11 obtains login information from the authentication key providing unit 30 if the functional-unit authentication unit 20 determines that the functional unit 10 is authenticated.

The functional unit 10, using the authentication key obtained by the authentication key obtaining unit 11, requests the authentication information unit 40 to provide login information of a user. In response to the request, the authentication information unit 40 verifies the validity of the authentication key and verifies authentication information of the functional unit 10, and if they are successfully verified, provides the login information of the user to the functional unit 10.

Here, login information includes a user ID and information indicating whether the user is logged into the image forming apparatus 1.

The functional-unit authentication unit 20 includes a first verification unit 21 and authentication information of the functional units 10.

The authentication information in the functional-unit authentication unit 20 indicates whether the functional units 10 are known to the functional-unit authentication unit 20. For example, the functional units 10 may be registered with the functional-unit authentication unit 20 in advance and the registration information may be used as the authentication information.

The first verification unit 21 determines whether the functional unit 10 is authenticated (registered). For example, the first verification unit 21 searches registration information in the functional-unit authentication unit 20 which includes records of plural functional units 10 and determines whether a record of a given functional unit 10 is in the registration information. Thus, the functional-unit authentication unit 20 proves the authenticity of the functional unit 10 by determining that a record of the functional unit 10 is in the registration information.

When requested by the functional unit 10 to provide the authentication key, the first verification unit 21 of the functional-unit authentication unit 20 determines whether the functional unit 10 is authenticated (registered). If the functional unit 10 is authenticated, the functional-unit authentication unit 20 requests the authentication key providing unit 30 to provide the authentication key. Then, after receiving the authentication key from the authentication key providing unit 30, the functional-unit authentication unit 20 transfers the authentication key to the functional unit 10.

When requested by the authentication key providing unit 30 to authenticate the functional unit 10, the first verification unit 21 of the functional-unit authentication unit 20 determines whether the functional unit 10 is authenticated (registered). If the functional unit 10 is authenticated, the functional-unit authentication unit 20 reports the result to the authentication key providing unit 30.

The authentication key providing unit 30 includes the authentication key and login information.

When requested by the functional-unit authentication unit 20 to provide the authentication key, the authentication key providing unit 30 provides the authentication key to the functional-unit authentication unit 20.

Meanwhile, when requested by the functional unit 10 to provide the authentication key, the authentication key providing unit 30 requests the functional-unit authentication unit 20 to authenticate the functional unit 10. If the authentication information of the functional unit 10 is successfully verified by the first verification unit 21 and a report indicating the result is sent from the functional-unit authentication unit 20, the authentication key providing unit 30 provides the authentication key to the functional unit 10.

Further, when requested by the functional unit 10 to provide the login information of a user, the authentication key providing unit 30 requests the functional-unit authentication unit 20 to authenticate the functional unit 10. If the authentication (registration) information of the functional unit 10 is successfully verified by the first verification unit 21 and a report indicating the result is sent from the functional-unit authentication unit 20, the authentication key providing unit 30, using its own authentication key, requests the authentication information unit 40 to provide the login information of the user. Then, after receiving the login information, the authentication key providing unit 30 provides the login information to the functional unit 10.

The authentication information unit 40 includes a second verification unit 41, a login information providing unit 42, login information, the authentication key, and authentication information of the functional units 10.

For example, the functional units 10 may be registered with the functional-unit authentication unit 20 in advance and the registration information may be used as the authentication information. Alternatively, information indicating a program structure of applications (the functional units 10) of the image forming apparatus 1 may be used as the authentication information.

When requested by the functional unit 10 to provide the login information using the authentication key, the second verification unit 41 determines whether the authentication key (obtained by the authentication key obtaining unit 11) of the functional unit 10 matches the authentication key in the authentication information unit 40.

If the second verification unit 41 determines that the authentication keys match, the login information providing unit 42 provides the login information of the user to the functional unit 10. The login information providing unit 42 may be configured either to provide login information each time when the login information is requested by the functional unit 10 or to automatically provide login information when the user logs in or logs out after the authentication key of the functional unit 10 is verified by the second verification unit 41.

Meanwhile, when requested by the authentication key providing unit 30 to provide the login information using the authentication key, the second verification unit 41 determines whether the authentication key of the authentication key providing unit 30 matches the authentication key in the authentication information unit 40. If the authentication keys match, the authentication information unit 40 provides the login information of the user to the authentication key providing unit 30.

The second verification unit 41 may be configured to also determine whether the functional unit 10 requesting the login information is authenticated in addition to determining whether the authentication key (obtained by the authentication key obtaining unit 11) of the functional unit 10 matches the authentication key in the authentication information unit 40. For example, the second verification unit 41 determines whether the functional unit 10 is authenticated by obtaining certain information from the functional unit 10 and determining whether the obtained information matches the authentication information of the functional unit 10 in the authentication information unit 40.

In this case, the login information providing unit 42 provides the login information of the user to the functional unit 10 if the authentication key and the authentication information of the functional unit 10 are successfully verified by the second verification unit 41.

Next, exemplary processes performed by the image forming apparatus 1 according to an embodiment of the present invention are described.

The image forming apparatus 1 performs different processes depending on whether the functional unit 10 requests the authentication key from the functional-unit authentication unit 20 or from the authentication key providing unit 30. First, a first process performed when the functional unit 10 requests the authentication key from the functional-unit authentication unit 20 is described.

In the first process, the authentication key obtaining unit 11 of the functional unit 10 requests the functional-unit authentication unit 20 to provide the authentication key. In response to the request, the first verification unit 21 of the functional-unit authentication unit 20 determines whether the functional unit 10 is registered (authenticated).

If the functional unit 10 is registered, the functional-unit authentication unit 20 transfers the request for the authentication key from the authentication key obtaining unit 11 to the authentication key providing unit 30. When receiving the request, the authentication key providing unit 30 provides the authentication key to the functional-unit authentication unit 20. Then, the functional-unit authentication unit 20 provides the authentication key to the requesting functional unit 10. Through the above process, the authentication key obtaining unit 11 of the functional unit 10 obtains the authentication key.

Using the authentication key obtained by the authentication key obtaining unit 11, the functional unit 10 requests the authentication information unit 40 to provide login information of a user.

When login information is requested, the second verification unit 41 of the authentication information unit 40 determines whether the authentication key (obtained by the authentication key obtaining unit 11) of the functional unit 10 matches the authentication key in the authentication information unit 40. If the authentication keys match, the login information providing unit 42 of the authentication information unit 40 provides the login information to the requesting functional unit 10.

The second verification unit 41 may be configured to also determine whether the functional unit 10 is authenticated in addition to determining whether the authentication key is valid. In this case, the login information providing unit 42 provides the login information to the functional unit 10 if the authentication key and the authentication information of the functional unit 10 are successfully verified by the second verification unit 41.

After obtaining the login information, the functional unit 10 determines whether the user is authenticated based on the obtained login information. If the user is authenticated, the functional unit 10 provides the user with a corresponding function of the image forming apparatus 1. For example, when the functional unit 10 is a copy application of the image forming apparatus 1, the functional unit 10 scans a document to obtain image data and outputs the image data on a plotter. As another example, when the functional unit 10 is a facsimile application of the image forming apparatus 1, the functional unit 10 scans a document to obtain image data or receives image data via a local area network (LAN), and faxes the image data.

Next, a second process performed when the functional unit 10 requests the authentication key from the authentication key providing unit 30 is described.

In the second process, the authentication key obtaining unit 11 of the functional unit 10 requests the authentication key providing unit 30 to provide the authentication key. The authentication key providing unit 30 requests the functional-unit authentication unit 20 to authenticate the functional unit 10 requesting the authentication key. In response to the request, the first verification unit 21 of the functional-unit authentication unit 20 determines whether the functional unit 10 is registered (authenticated).

If the functional unit 10 is registered, the functional-unit authentication unit 20 reports the result to the authentication key providing unit 30. When receiving the report, the authentication key providing unit 30 provides the authentication key to the requesting functional unit 10. Through the above process, the authentication key obtaining unit 11 of the functional unit 10 obtains the authentication key.

Using the authentication key obtained by the authentication key obtaining unit 11, the functional unit 10 requests the authentication information unit 40 to provide login information of a user.

When login information is requested, the second verification unit 41 of the authentication information unit 40 determines whether the authentication key (obtained by the authentication key obtaining unit 11) of the functional unit 10 matches the authentication key in the authentication information unit 40. If the authentication keys match, the login information providing unit 42 of the authentication information unit 40 provides the login information to the requesting functional unit 10.

The second verification unit 41 may be configured to also determine whether the functional unit 10 is authenticated in addition to determining whether the authentication key is valid. In this case, the login information providing unit 42 provides the login information to the functional unit 10 if the authentication key and the authentication information of the functional unit 10 are successfully verified by the second verification unit 41.

After obtaining the login information, the functional unit 10 determines whether the user is authenticated based on the obtained login information. If the user is authenticated, the functional unit 10 provides the user with a corresponding function of the image forming apparatus 1. For example, when the functional unit 10 is a copy application of the image forming apparatus 1, the functional unit 10 scans a document to obtain image data and outputs the image data on a plotter. As another example, when the functional unit 10 is a facsimile application of the image forming apparatus 1, the functional unit 10 scans a document to obtain image data or receives image data via a local area network (LAN), and faxes the image data.

Next, a third process is described as still another example. In the third process, the authentication key providing unit 30 requests authentication of the functional unit 10, obtains login information from the authentication information unit 40 using its own authentication key, and provides the obtained login information to the functional unit 10.

First, the authentication key obtaining unit 11 of the functional unit 10 requests the authentication key providing unit 30 to provide login information of a user. The authentication key providing unit 30 requests the functional-unit authentication unit 20 to authenticate the functional unit 10 requesting the login information. In response to the request, the first verification unit 21 of the functional-unit authentication unit 20 determines whether the functional unit 10 is registered (authenticated).

If the functional unit 10 is registered, the functional-unit authentication unit 20 reports the result to the authentication key providing unit 30. When receiving the report, the authentication key providing unit 30 requests the authentication information unit 40 to provide the login information of the user using its own authentication key.

When login information is requested, the second verification unit 41 of the authentication information unit 40 determines whether the authentication key of the authentication key providing unit 30 matches the authentication key in the authentication information unit 40. If the authentication keys match, the login information providing unit 42 of the authentication information unit 40 provides the login information to the authentication key providing unit 30.

Then, the authentication key providing unit 30 provides the login information to the requesting functional unit 10. Through the above process, the authentication key obtaining unit 11 of the functional unit 10 obtains the login information of the user.

After obtaining the login information, the functional unit 10 determines whether the user is authenticated based on the obtained login information. If the user is authenticated, the functional unit 10 provides the user with a corresponding function of the image forming apparatus 1. For example, when the functional unit 10 is a copy application of the image forming apparatus 1, the functional unit 10 scans a document to obtain image data and outputs the image data on a plotter. As another example, when the functional unit 10 is a facsimile application of the image forming apparatus 1, the functional unit 10 scans a document to obtain image data or receives image data via a local area network (LAN), and faxes the image data.

Thus, the above embodiment of the present invention provides an image forming apparatus that allows applications to share authentication information (login information) of users while assuring the security of the authentication information.

<Software Configuration of Image Forming Apparatus>

Figure 2:
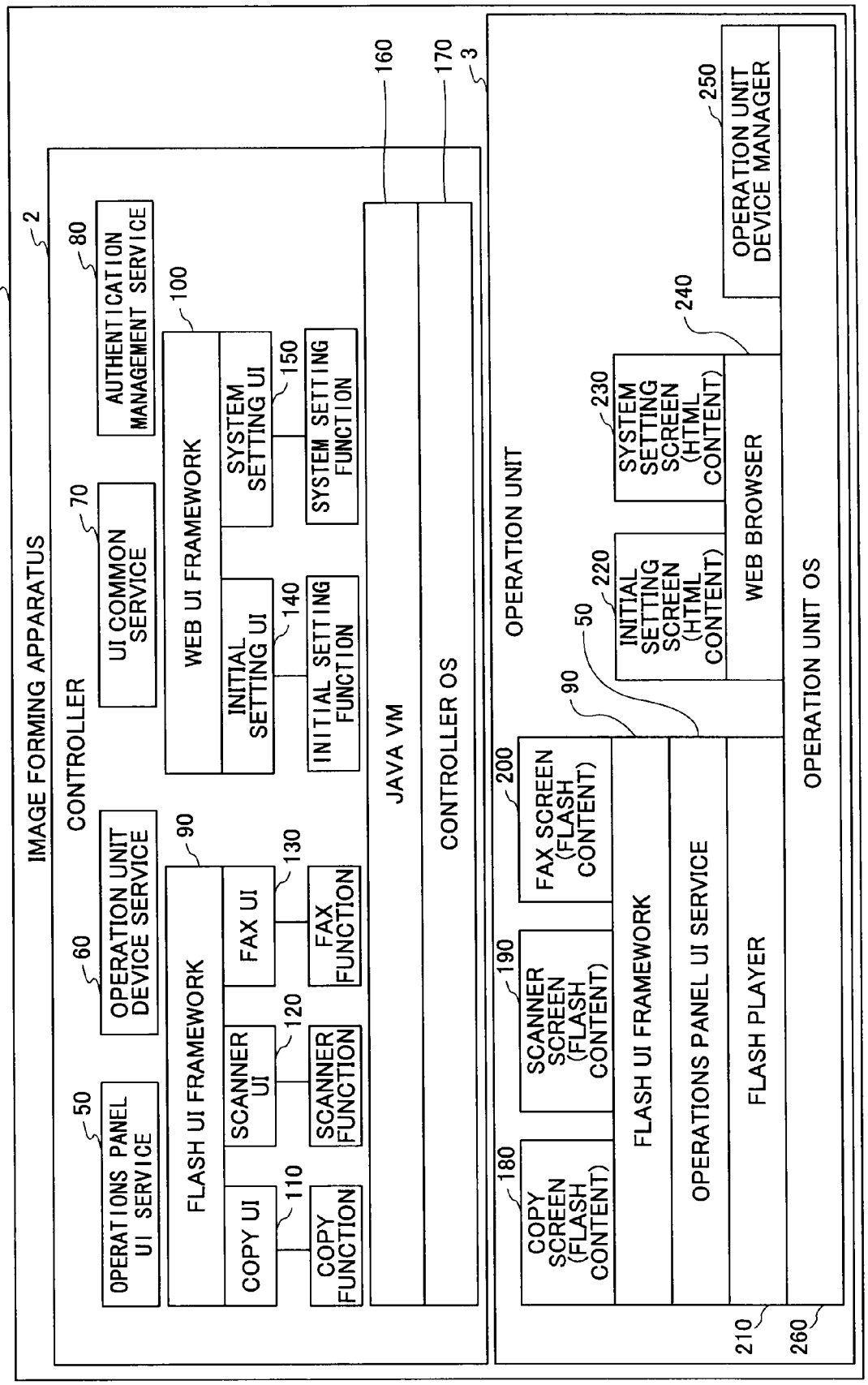
FIG. 2 is a drawing illustrating a software configuration of an image forming apparatus according to an embodiment of the present invention.

FIG. 2 is a drawing illustrating a software configuration of the image forming apparatus 1 according to an embodiment of the present invention.

As shown in FIG. 2, the image forming apparatus 1 includes a controller 2 and an operation unit 3. The controller 2 includes applications that implement functions of the image forming apparatus 1 and applications for setting various parameters of the image forming apparatus 1. The operation unit 3 includes applications for receiving user inputs.

The controller 2 includes an operations panel UI service 50, an operation unit device service 60, a UI common service 70, an authentication management service 80, a Flash UI framework 90, a Web UI framework 100, a copy UI 110, a scanner UI 120, a FAX UI 130, an initial setting UI 140, a system setting UI 150, a Java VM 160, and a controller operating system (OS) 170.

The operations panel UI service 50 provides functions, for example, for communications between the controller 2 and the operation unit 3 and for controlling devices, which are common to user interfaces on an operations panel.

The operation unit device service 60 communicates with an operation unit device manager 250 of the operation unit 3 and thereby sends control instructions to and receives responses from devices.

The UI common service 70 manages a key used to obtain authentication information (login information of users) from the authentication management service 80.

The authentication management service 80 provides authentication information (login information) of users of the image forming apparatus 1. The authentication management service 80 also records and manages information regarding logging in and out of users of the image forming apparatus 1.

The Flash UI framework 90 is a common framework for controlling Flash content.

The Web UI framework 100 is a common framework for controlling hypertext markup language (HTML) content.

The copy UI 110, the scanner UI 120, the FAX UI 130, the initial setting UI 140, and the system setting UI 150 are applications for controlling user interface screens. For example, those UIs obtain information to be displayed for the corresponding functions and request execution of the functions. Here, it is assumed that the copy UI 110, the scanner UI 120, and the FAX UI 130 are created based on the Flash UI framework 90, and the initial setting UI 140 and the system setting UI 150 are created based on the Web UI framework 100.

The Java VM 160 is software that converts Java bytecode into native code of the platform and executes the native code.

The controller OS 170 is an operating system of the controller 2.

The operation unit 3 includes a copy screen (Flash content) 180, a scanner screen (Flash content) 190, a FAX screen (Flash content) 200, the Flash UI framework 90, the operations panel UI service 50, a Flash player 210, an initial setting screen (HTML content) 220, a system setting screen (HTML content) 230, a Web browser 240, the operation unit device manager 250, and an operation unit OS 260.

The copy screen (Flash content) 180, the scanner screen (Flash content) 190, the FAX screen (Flash content) 200, the initial setting screen (HTML content) 220, and the system setting screen (HTML content) 230 are contents for providing the user with the corresponding functions.

The Flash player 210 is software for displaying Flash content. The Web browser 240 is software for displaying HTML content. The copy screen (Flash content) 180, the scanner screen (Flash content) 190, and the FAX screen (Flash content) 200 can be displayed using the Flash player 210. The initial setting screen (HTML content) 220 and the system setting screen (HTML content) 230 can be displayed using the Web browser 240.

The operation unit device manager 250 switches between the Flash player 210 and the Web browser 240, and controls LEDs, a buzzer, hard keys, a touch panel, and so on. The operation unit device manager 250 also communicates with the operation unit device service 60 of the controller 2 and thereby sends control instructions to and receives responses from the devices.

The operation unit OS 260 is an operating system of the operation unit 3.

In this embodiment, the functional units 10 correspond to the copy UI 110, the scanner UI 120, the FAX UI 130, the initial setting UI 140, and the system setting UI 150.

The functional-unit authentication unit 20 corresponds to the operations panel UI service 50, the Flash UI framework 90, and the Web UI framework 100. The operations panel UI service 50 retains registration information (authentication information) of the copy UI 110, the scanner UI 120, the FAX UI 130, the initial setting UI 140, and the system setting UI 150. The Flash UI framework 90 retains registration information (authentication information) of the copy UI 110, the scanner UI 120, and the FAX UI 130. The Web UI framework 100 retains registration information (authentication information) of the initial setting UI 140 and the system setting UI 150. The first verification unit 21 determines whether the respective functional units 10 are authenticated based on the registration information.

Also in this embodiment, the authentication key providing unit 30 corresponds to the UI common service 70 and the authentication information unit 40 corresponds to the authentication management service 80.

Each of the copy UI 110, the scanner UI 120, the FAX UI 130, the initial setting UI 140, and the system setting UI 150 includes the authentication key obtaining unit 11 for obtaining the key used to obtain authentication information (login information of a user) from the authentication management service 80 (the authentication information unit 40). The copy UI 110, the scanner UI 120, the FAX UI 130, the initial setting UI 140, and the system setting UI 150, respectively, obtain login information from the authentication management service 80 (the authentication information unit 40) or the UI common service 70 (the authentication key providing unit 30).

When the registration information of the UI (the functional unit 10) is verified by the first verification unit 21 of the operations panel UI service 50, the Flash UI framework 90, or the Web UI framework 100, the UI common service 70 provides the key used to obtain login information of a user from the authentication management service 80 (the authentication information unit 40). In a different case, the UI common service 70 obtains login information from the authentication management service 80 (the authentication information unit 40) using its own key and provides the obtained login information to the UI (the functional unit 10).

The authentication management service 80 provides login information indicating whether a user is logged into the image forming apparatus 1 to the UI (the functional unit 10) or the UI common service 70 (the authentication key providing unit 30).

<Hardware Configuration of Image Forming Apparatus>

Figure 3:
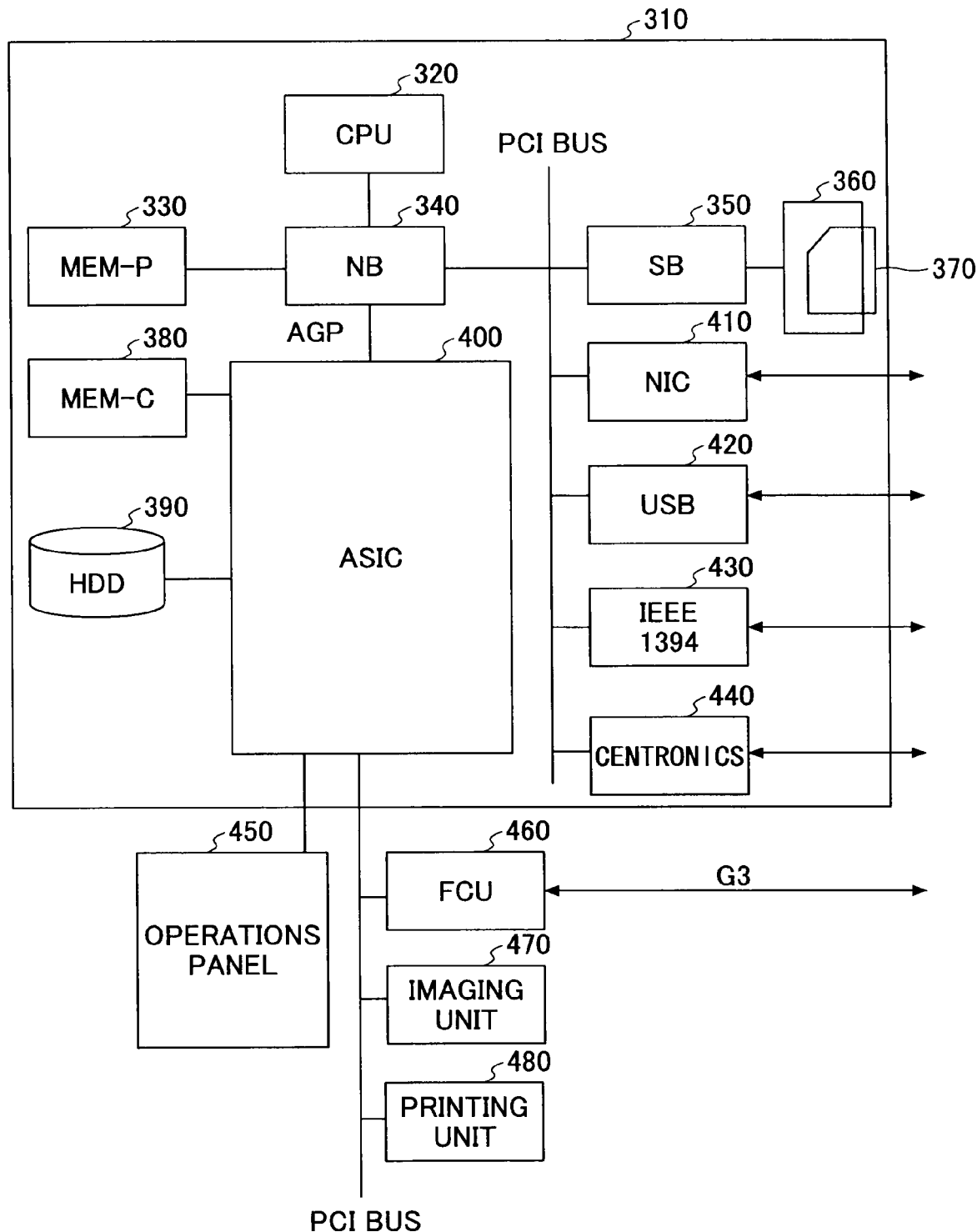
FIG. 3 is a block diagram illustrating a hardware configuration of an image forming apparatus according to an embodiment of the present invention.

FIG. 3 is a drawing illustrating a hardware configuration of the image forming apparatus 1 according to an embodiment of the present invention.

The image forming apparatus 1 includes, as hardware components, a controller 310, an operations panel 450, a facsimile control unit (FCU) 460, an imaging unit (scanner) 470, and a printing unit (plotter) 480.

The controller 310 includes a central processing unit (CPU) 320, an application specific integrated circuit (ASIC) 400, a northbridge (NB) 340, a southbridge (SB) 350, a MEM-P 330, a MEM-C 380, a hard disk drive (HDD) 390, a memory card slot 360, a network interface controller (NIC) 410, a universal serial bus (USB) interface 420, an IEEE 1394 interface 430, and a Centronics interface 440.

The CPU 320 is an integrated circuit (IC) for information processing. The ASIC 400 is an IC for image processing. The NB 340 is a northbridge of the controller 310. The SB 350 is a southbridge of the controller 310. The MEM-P 330 is a system memory of the image forming apparatus 1. The MEM-C 380 is a local memory of the image forming apparatus 1. The HDD 390 is a storage device of the image forming apparatus 1. The memory card slot 360 is a card slot for a memory card 370. The NIC 410 is a controller for controlling network communications based on MAC addresses. The USB interface 420 is an interface for connecting USB devices. The IEEE 1394 interface 430 is an interface for connecting devices conforming to the IEEE 1394 standard. The Centronics interface 440 is an interface for connecting devices conforming to the Centronics standard. The operations panel 450 functions both as a console for user input and a display unit for displaying information from the image forming apparatus 1.

Software programs of the image forming apparatus 1 are stored, for example, in the MEM-C 380 and are executed by the CPU 320 to cause the image forming apparatus 1 to perform the corresponding functions.

<First Embodiment>

Figure 4:
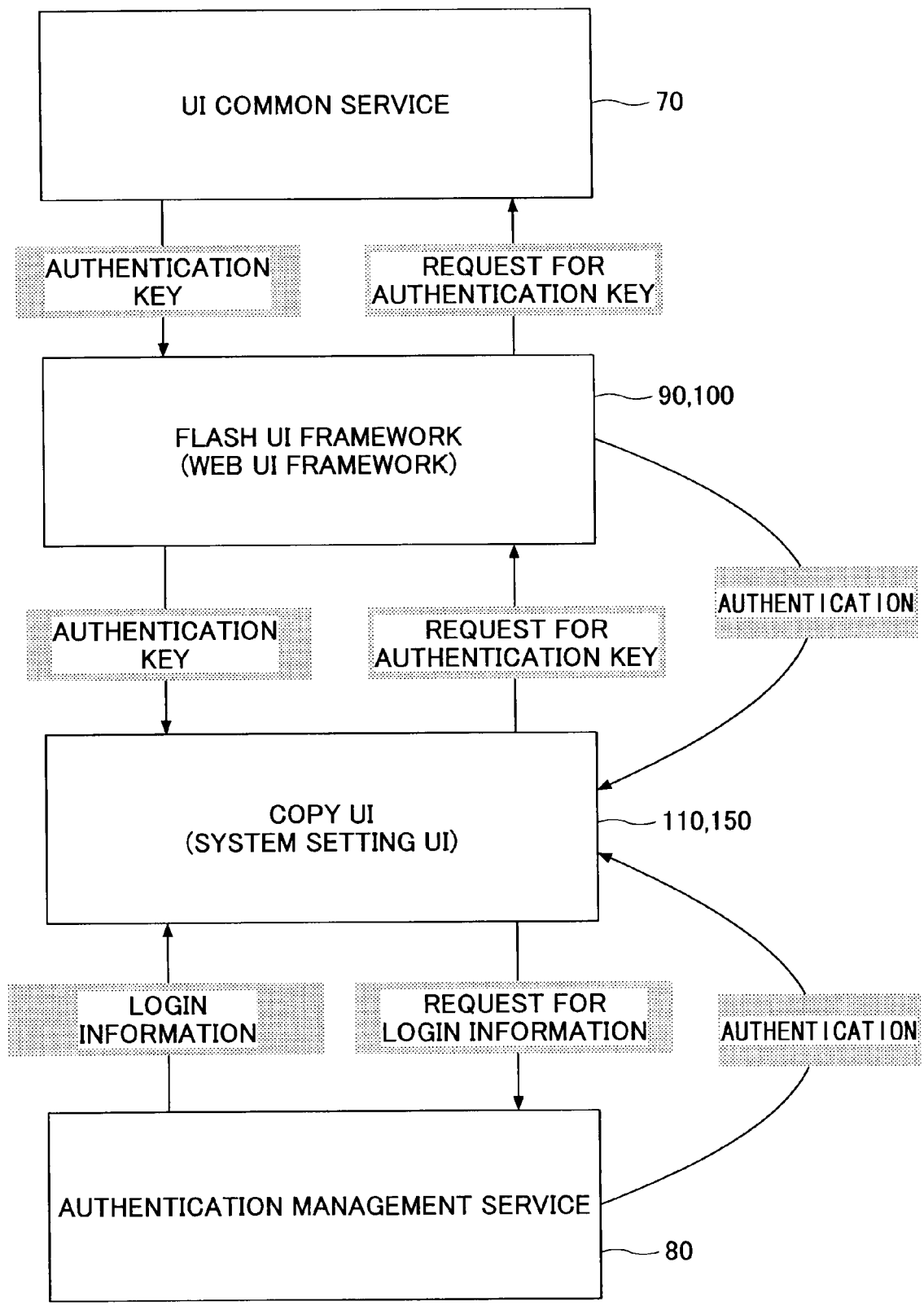
FIG. 4 is a drawing illustrating data flow in an image forming apparatus according to a first embodiment of the present invention.
Figure 5:
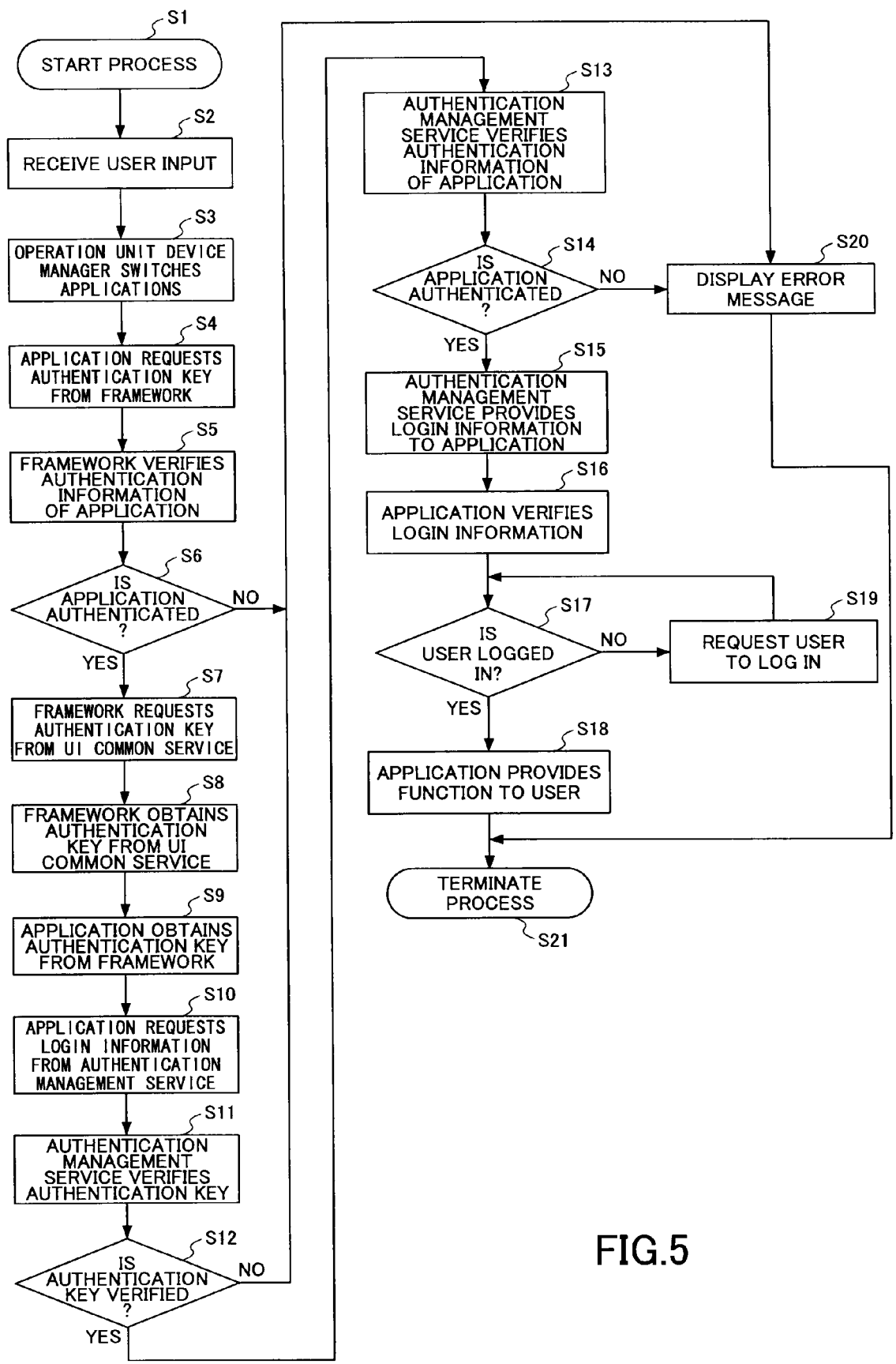
FIG. 5 is a flowchart showing an exemplary process in an image forming apparatus according to the first embodiment.

A first embodiment of the present invention is described below with reference to FIGS. 4 and 5. FIG. 4 is a drawing illustrating data flow in the image forming apparatus 1 according to the first embodiment. FIG. 5 is a flowchart showing an exemplary process in the image forming apparatus 1 according to the first embodiment.

In the first embodiment, as shown in FIG. 4, the copy UI 110 requests the Flash UI framework 90 to obtain the authentication key from the UI common service 70 and obtains login information from the authentication management service 80 using the obtained authentication key.

In step S1 shown in FIG. 5, the image forming apparatus 1 starts the process.

In step S2, the image forming apparatus 1 receives input from a user. Here, it is assumed that the user input is a request to switch screens from the initial setting screen 220 or the system setting screen 230 to the copy screen 180 to copy a document with the image forming apparatus 1.

In step S3, the operation unit device manager 250 switches content browsers from the Web browser 240 to the Flash player 210.

In step S4, the authentication key obtaining unit 11 of the copy UI 110 requests the Flash UI framework 90 to provide the authentication key.

In step S5, the first verification unit 21 of the Flash UI framework 90 verifies the registration information (authentication information) of the copy UI 110.

If the registration information of the copy UI 110 is successfully verified by the first verification unit 21 (YES in step S6), the Flash UI framework 90, in step S7, requests the UI common service 70 to provide the authentication key.

If the registration information of the copy UI 110 is not successfully verified by the first verification unit 21 (NO in step S6), the image forming apparatus 1, in step S20, displays an error message on the operations panel 450.

In step S8, the Flash UI framework 90 obtains the authentication key from the UI common service 70.

In step S9, the authentication key obtaining unit 11 of the copy UI 110 obtains the authentication key from the Flash UI framework 90.

In step S10, using the authentication key obtained by the authentication key obtaining unit 11, the copy UI 110 requests the authentication management service 80 to provide login information (including a user ID and information indicating whether the user is logged in) of the user.

In step S11, the second verification unit 41 of the authentication management service 80 determines whether the authentication key (obtained by the authentication key obtaining unit 11) of the copy UI 110 matches the authentication key in the authentication management service 80.

If the authentication keys match (YES in step S12), the second verification unit 41 of the authentication management service 80, in step S13, verifies the authentication information of the copy UI 110.

Meanwhile, if the authentication keys do not match (NO in step S12), the image forming apparatus 1, in step S20, displays an error message on the operations panel 450.

If the authentication information of the copy UI 110 is successfully verified by the second verification unit 41 (YES in step S14), the login information providing unit 42 of the authentication management service 80, in step S15, provides the login information to the copy UI 110.

If the authentication information of the copy UI 110 is not successfully verified by the second verification unit 41 (NO in step S14), the image forming apparatus 1, in step S20, displays an error message on the operations panel 450.

In step S16, the copy UI 110 determines whether the user is already logged into the image forming apparatus 1 based on the login information obtained from the login information providing unit 42.

If the user is already logged into the image forming apparatus 1 (YES in step S17), the copy UI 110, in step S18, provides the copy function to the user. In other words, the user is allowed to copy a document with the image forming apparatus 1. In response to operations of the user, the copy UI 110 scans a document with the scanner 470 to obtain image data and outputs the image data on the plotter 480.

If the user is not logged into the image forming apparatus 1 (NO in step S17), the copy UI 110, in step S19, requests the user to log into the image forming apparatus 1. For example, the copy UI 110 requests the user to input a user ID and a password to authenticate the user.

In step S21, the image forming apparatus 1 terminates the process.

Thus, the first embodiment of the present invention provides an image forming apparatus that allows applications to share authentication information (login information) of users while assuring the security of the authentication information.

<Second Embodiment>

Figure 6:
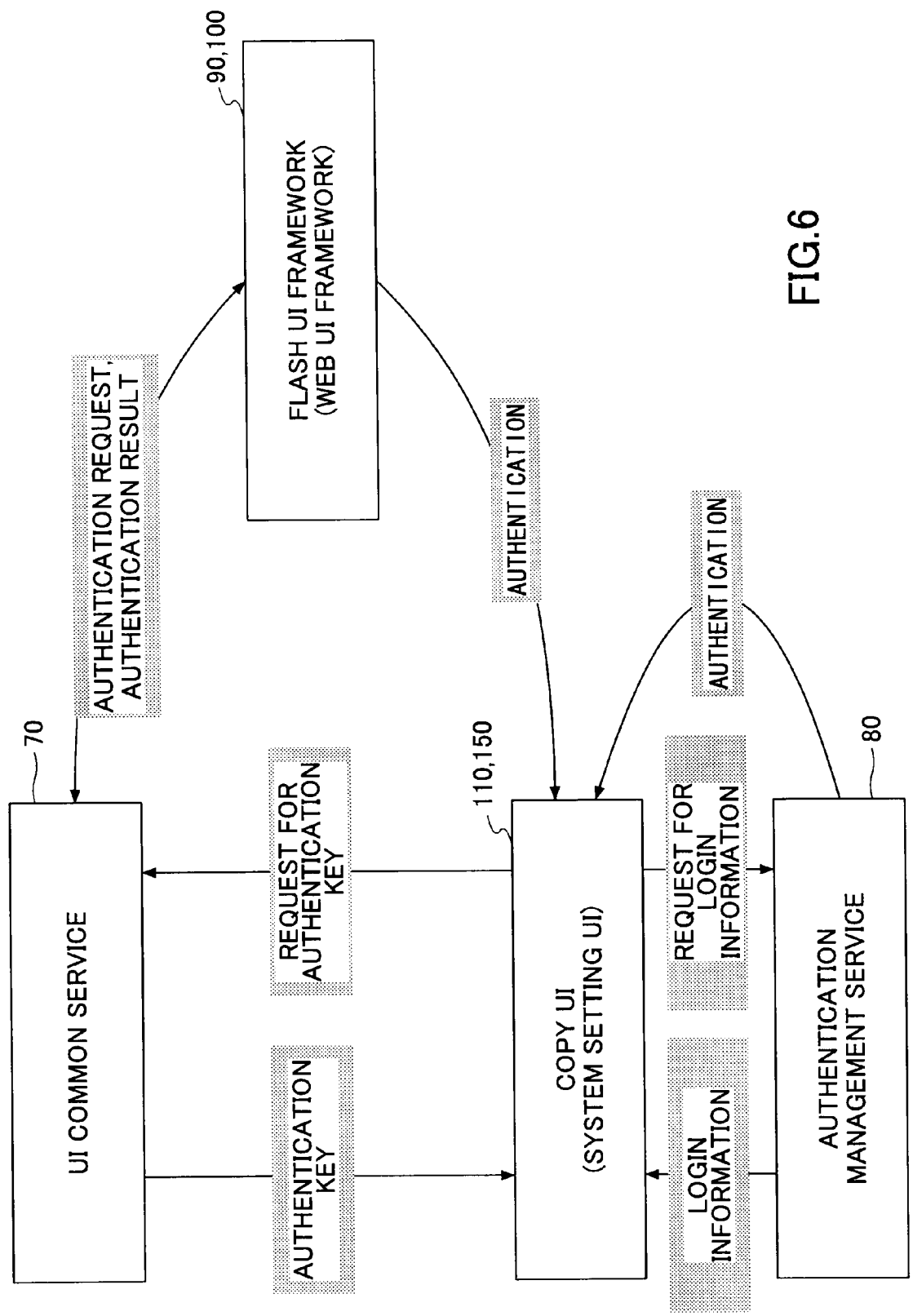
FIG. 6 is a drawing illustrating data flow in an image forming apparatus according to a second embodiment of the present invention.
Figure 7:
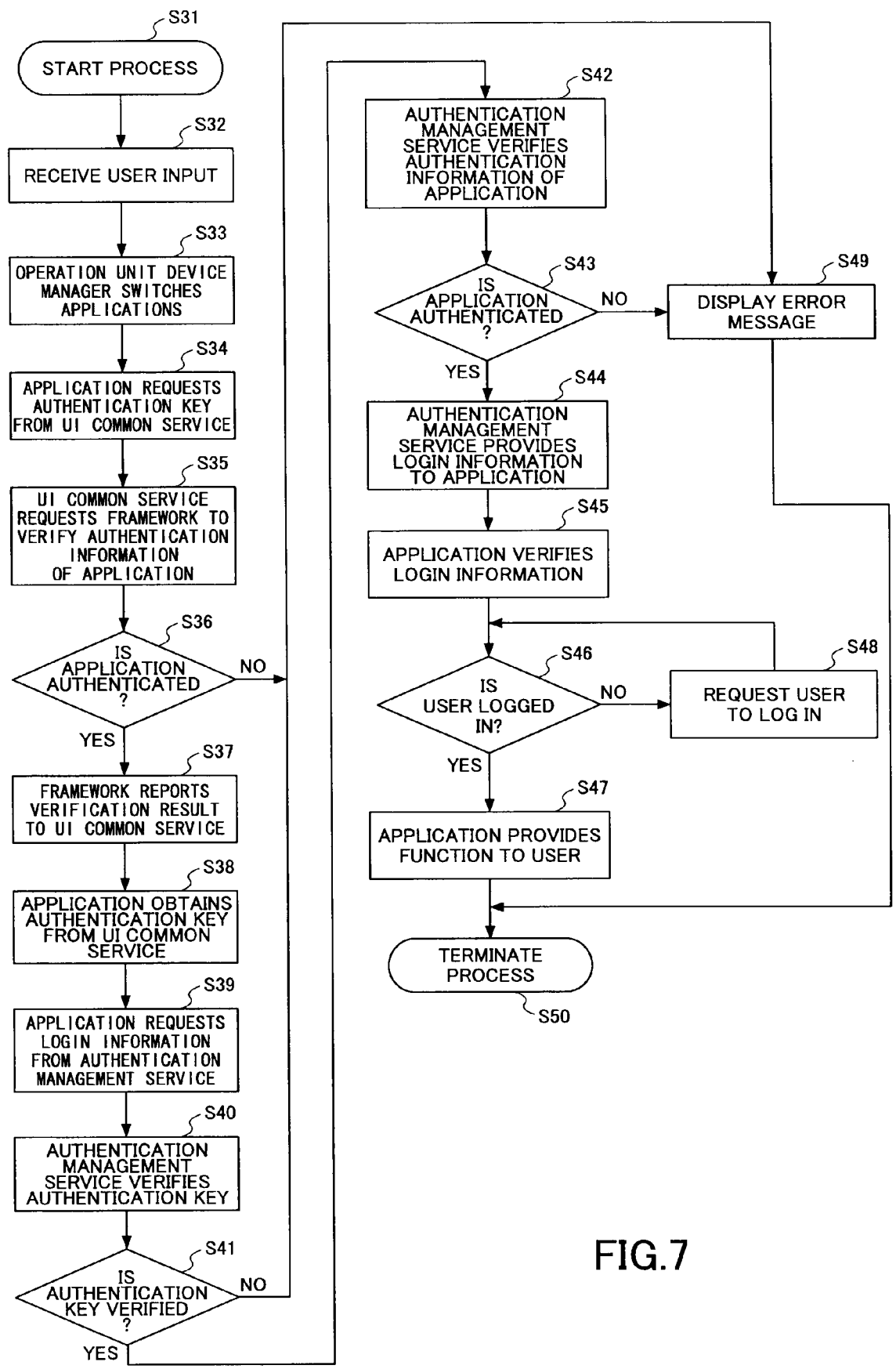
FIG. 7 is a flowchart showing an exemplary process in an image forming apparatus according to the second embodiment.

A second embodiment of the present invention is described below with reference to FIGS. 6 and 7. FIG. 6 is a drawing illustrating data flow in the image forming apparatus 1 according to the second embodiment. FIG. 7 is a flowchart showing an exemplary process in the image forming apparatus 1 according to the second embodiment.

In the second embodiment, as shown in FIG. 6, the copy UI 110 directly requests the UI common service 70 (without the intermediary of the Flash UI framework 90) to provide the authentication key and obtains login information from the authentication management service 80 using the provided authentication key.

In step S31 shown in FIG. 6, the image forming apparatus 1 starts the process.

In step S32, the image forming apparatus 1 receives input from a user. Here, it is assumed that the user input is a request to switch screens from the initial setting screen 220 or the system setting screen 230 to the copy screen 180 to copy a document with the image forming apparatus 1.

In step S33, the operation unit device manager 250 switches content browsers from the Web browser 240 to the Flash player 210.

In step S34, the authentication key obtaining unit 11 of the copy UI 110 requests the UI common service 70 to provide the authentication key.

In step S35, the UI common service 70 requests the Flash UI framework 90 to verify the registration information (authentication information) of the copy UI 110.

If the registration information of the copy UI 110 is successfully verified by the first verification unit 21 of the Flash UI framework 90 (YES in step S36), the Flash UI framework 90, in step S37, reports the successful verification of the registration information of the copy UI 110 to the UI common service 70.

If the registration information of the copy UI 110 is not successfully verified by the first verification unit 21 of the Flash UI framework 90 (NO in step S36), the image forming apparatus 1, in step S49, displays an error message on the operations panel 450.

In step S38, the authentication key obtaining unit 11 of the copy UI 110 obtains the authentication key from the UI common service 70.

In step S39, using the authentication key obtained by the authentication key obtaining unit 11, the copy UI 110 requests the authentication management service 80 to provide login information (including a user ID and information indicating whether the user is already logged in) of the user.

In step S40, the second verification unit 41 of the authentication management service 80 determines whether the authentication key (obtained by the authentication key obtaining unit 11) of the copy UI 110 matches the authentication key in the authentication management service 80.

If the authentication keys match (YES in step S41), the second verification unit 41 of the authentication management service 80, in step S42, verifies the authentication information of the copy UI 110.

If the authentication keys do not match (NO in step S41), the image forming apparatus 1, in step S49, displays an error message on the operations panel 450.

If the authentication information of the copy UI 110 is successfully verified by the second verification unit 41 (YES in step S43), the login information providing unit 42 of the authentication management service 80, in step S44, provides the login information to the copy UI 110.

If the authentication information of the copy UI 110 is not successfully verified by the second verification unit 41 (NO in step S43), the image forming apparatus 1, in step S49, displays an error message on the operations panel 450.

In step S45, the copy UI 110 determines whether the user is already logged into the image forming apparatus 1 based on the login information obtained from the login information providing unit 42.

If the user is already logged into the image forming apparatus 1 (YES in step S46), the copy UI 110, in step S47, provides the copy function to the user. In other words, the user is allowed to copy a document with the image forming apparatus 1. In response to operations of the user, the copy UI 110 scans a document with the scanner 470 to obtain image data and outputs the image data on the plotter 480.

If the user is not logged into the image forming apparatus 1 (NO in step S46), the copy UI 110, in step S48, requests the user to log into the image forming apparatus 1. For example, the copy UI 110 requests the user to input a user ID and a password to authenticate the user.

In step S50, the image forming apparatus 1 terminates the process.

Thus, the second embodiment of the present invention provides an image forming apparatus that allows applications to share authentication information (login information) of users while assuring the security of the authentication information.

<Third Embodiment>

Figure 8:
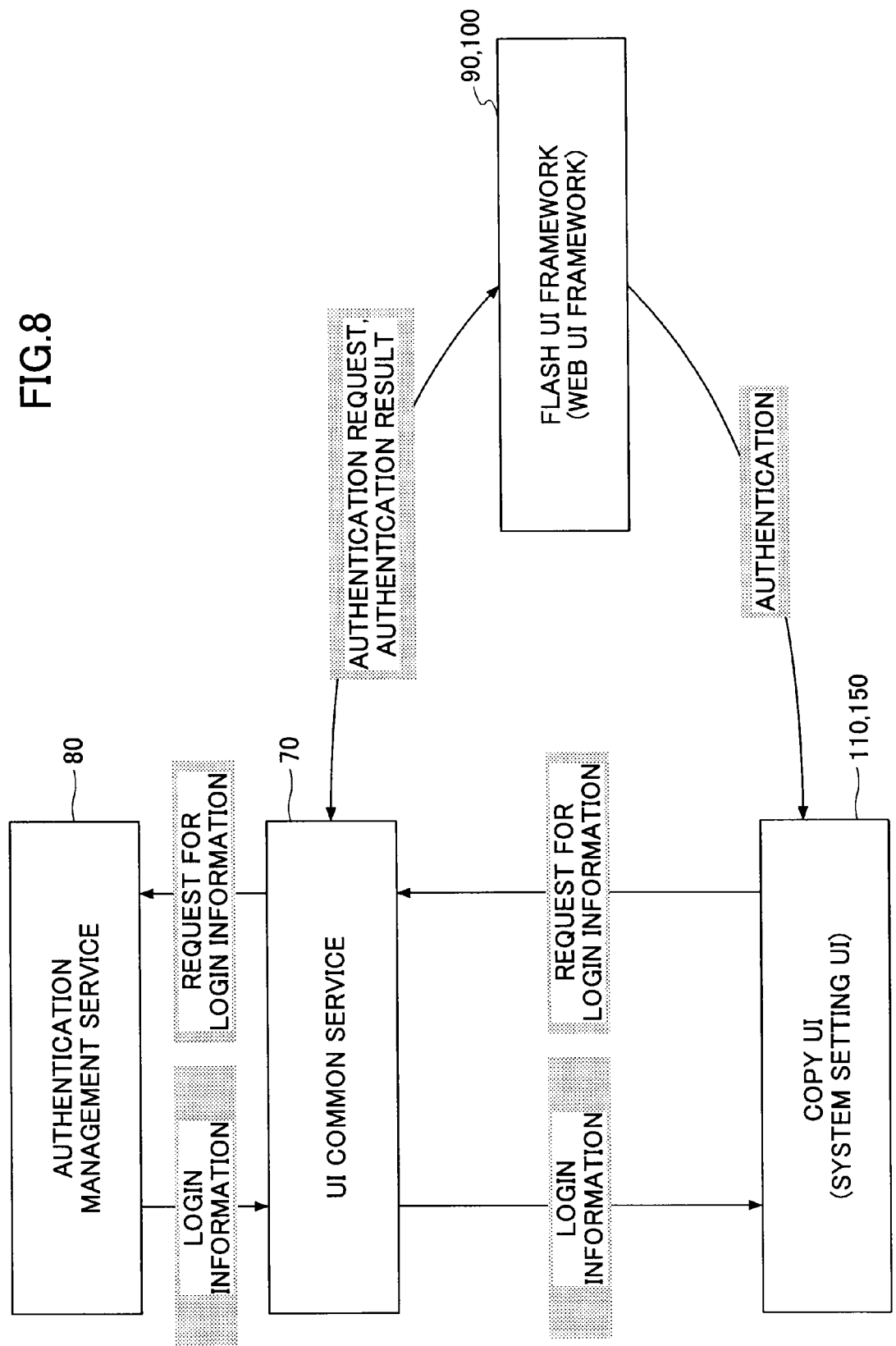
FIG. 8 is a drawing illustrating data flow in an image forming apparatus according to a third embodiment of the present invention.
Figure 9:
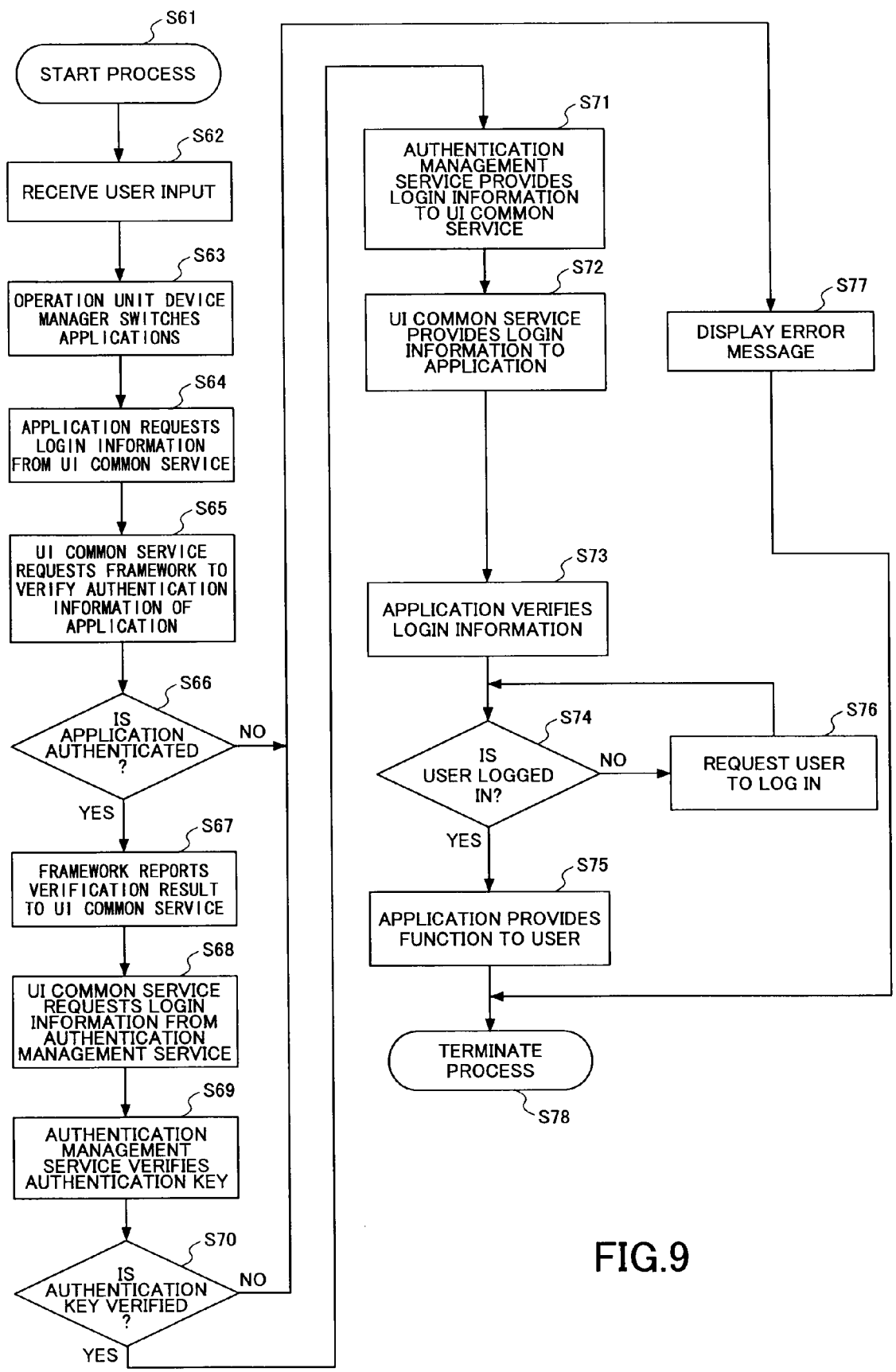
FIG. 9 is a flowchart showing an exemplary process in an image forming apparatus according to the third embodiment.

A third embodiment of the present invention is described below with reference to FIGS. 8 and 9. FIG. 8 is a drawing illustrating data flow in the image forming apparatus 1 according to the third embodiment. FIG. 9 is a flowchart showing an exemplary process in the image forming apparatus 1 according to the third embodiment.

In the third embodiment, as shown in FIG. 8, the copy UI 110 requests the UI common service 70 to provide login information, and the UI common service 70 obtains the login information from the authentication management service 80 using its own authentication key and provides the obtained login information to the copy UI 110.

In step S61 shown in FIG. 9, the image forming apparatus 1 starts the process.

In step S62, the image forming apparatus 1 receives input from a user. Here, it is assumed that the user input is a request to switch screens from the initial setting screen 220 or the system setting screen 230 to the copy screen 180 to copy a document with the image forming apparatus 1.

In step S63, the operation unit device manager 250 switches content browsers from the Web browser 240 to the Flash player 210.

In step S64, the authentication key obtaining unit 11 of the copy UI 110 requests the UI common service 70 to provide login information (including a user ID and information indicating whether the user is already logged in) of the user.

In step S65, the UI common service 70 requests the Flash UI framework 90 to verify the registration information (authentication information) of the copy UI 110.

If the registration information of the copy UI 110 is successfully verified by the first verification unit 21 of the Flash UI framework 90 (YES in step S66), the Flash UI framework 90, in step S67, reports the successful verification of the registration information of the copy UI 110 to the UI common service 70.

If the registration information of the copy UI 110 is not successfully verified by the first verification unit 21 of the Flash UI framework 90 (NO in step S66), the image forming apparatus 1, in step S77, displays an error message on the operations panel 450.

In step S68, the UI common service 70 requests the authentication management service 80 to provide the login information using its own authentication key.

In step S69, the second verification unit 41 of the authentication management service 80 determines whether the authentication key of the UI common service 70 matches the authentication key in the authentication management service 80.

If the authentication keys match (YES in step S70), the login information providing unit 42 of the authentication management service 80, in step S71, provides the login information to the UI common service 70.

If the authentication keys do not match (NO in step S70), the image forming apparatus 1, in step S77, displays an error message on the operations panel 450.

In step S72, the authentication key obtaining unit 11 of the copy UI 110 obtains the login information from the UI common service 70.

In step S73, the copy UI 110 determines whether the user is already logged into the image forming apparatus 1 based on the login information obtained by the authentication key obtaining unit 11.

If the user is already logged into the image forming apparatus 1 (YES in step S74), the copy UI 110, in step S75, provides the copy function to the user. In other words, the user is allowed to copy a document with the image forming apparatus 1. In response to operations of the user, the copy UI 110 scans a document with the scanner 470 to obtain image data and outputs the image data on the plotter 480.

If the user is not logged into the image forming apparatus 1 (NO in step S74), the copy UI 110, in step S76, requests the user to log into the image forming apparatus 1. For example, the copy UI 110 requests the user to input a user ID and a password to authenticate the user.

In step S78, the image forming apparatus 1 terminates the process.

Thus, the third embodiment of the present invention provides an image forming apparatus that allows applications to share authentication information (login information) of users while assuring the security of the authentication information.

As described above, embodiments of the present invention provide an image forming apparatus, an image forming method (or a method of obtaining login information, or an authentication method), and a storage medium storing program code for causing the image forming apparatus to perform the image forming method that allow applications of the image forming apparatus to share authentication information (login information) of users while assuring the security of the authentication information.

The present invention is not limited to the specifically disclosed embodiments, and variations and modifications may be made without departing from the scope of the present invention.

The present application is based on Japanese Priority Application No. 2008-023046, filed on Feb. 1, 2008, the entire contents of which are hereby incorporated herein by reference.

What is claimed is:

1. An image forming apparatus, comprising:
an authentication information unit including login information indicating whether a user is logged into the image forming apparatus and an authentication key used to obtain the login information;
an authentication key providing unit including the authentication key;
a plurality of functional units implementing functions of the image forming apparatus; and
a functional-unit authentication unit including authentication information indicating whether each of the functional units is authenticated and a first verification unit configured to determine whether one of the functional units is authenticated based on the authentication information; wherein
each of the functional units includes an authentication key obtaining unit configured to obtain the authentication key from the authentication key providing unit when the first verification unit determines that said one of the functional units is authenticated; and
the authentication information unit further includes
a second verification unit configured to determine whether the authentication key obtained by the authentication key obtaining unit of said one of the functional units matches the authentication key included in the authentication information unit, and
a login information providing unit configured to provide the login information to said one of the functional units when the second verification unit determines that the authentication key obtained by the authentication key obtaining unit of said one of the functional units matches the authentication key included in the authentication information unit.

2. The image forming apparatus as claimed in claim 1, wherein
the authentication information unit further includes the authentication information indicating whether the functional units are authenticated;
the second verification unit is configured to further determine whether the each of the functional units is authenticated based on the authentication information in the authentication information unit; and
the login information providing unit is configured to provide the login information to the each of the functional units if the second verification unit further determines that the each of the functional units is authenticated.

3. The image forming apparatus as claimed in claim 1, wherein
the authentication key providing unit is configured to obtain the login information from the authentication information unit in response to a request from the each of the functional units; and
the authentication key obtaining unit is configured to obtain the login information instead of the authentication key from the authentication key providing unit.

4. An image forming method in an image forming apparatus,
the image forming apparatus including:
an authentication information unit including login information indicating whether a user is logged into the image forming apparatus and an authentication key used to obtain the login information;
an authentication key providing unit including the authentication key;
a plurality of functional units implementing functions of the image forming apparatus; and
a functional-unit authentication unit including authentication information indicating whether each of the functional units is authenticated,
the image forming method comprising:
a first verification step, performed by the functional-unit authentication unit, of determining whether one of the functional units is authenticated based on the authentication information;
an authentication key obtaining step, performed by said one of the functional units, of obtaining the authentication key from the authentication key providing unit when said one of the functional units is determined to be authenticated in the first verification step;
a second verification step, performed by the authentication information unit, of determining whether the authentication key obtained in the authentication key obtaining step matches the authentication key included in the authentication information unit; and
a login information providing step, performed by the authentication information unit, of providing the login information to said one of the functional units when the authentication key obtained in the authentication key obtaining step matches the authentication key included in the authentication information unit.

5. The image forming method as claimed in claim 4, wherein
the authentication information unit further includes the authentication information indicating whether the functional units are authenticated;
in the second verification step, whether said one of the functional units is authenticated is also determined based on the authentication information in the authentication information unit; and
in the login information providing step, the login information is provided to said one of the functional units if the given one of the functional units is also determined to be authenticated in the second verification step.

6. The image forming method as claimed in claim 4, further comprising:
a login information obtaining step, performed by the authentication key providing unit in response to a request from said one of the functional units, of obtaining the login information from the authentication information unit;
wherein in the authentication key obtaining step, the login information is obtained instead of the authentication key from the authentication key providing unit.

7. A non-transitory storage medium having program code embodied therein for causing an image forming apparatus to perform an image forming method,
the image forming apparatus including:
an authentication information unit including login information indicating whether a user is logged into the image forming apparatus and an authentication key used to obtain the login information;
an authentication key providing unit including the authentication key;
a plurality of functional units implementing functions of the image forming apparatus; and a functional-unit authentication unit including authentication information indicating whether each of the functional units is authenticated, the image forming method comprising:

a first verification step, performed by the functional-unit authentication unit, of determining whether one of the functional units is authenticated based on the authentication information;

an authentication key obtaining step, performed by said one of the functional units, of obtaining the authentication key from the authentication key providing unit when said one of the functional units is determined to be authenticated in the first verification step;

a second verification step, performed by the authentication information unit, of determining whether the authentication key obtained in the authentication key obtaining step matches the authentication key included in the authentication information unit; and a login information providing step, performed by the authentication information unit, of providing the login information to said one of the functional units when the authentication key obtained in the authentication key obtaining step matches the authentication key included in the authentication information unit.

8. The non-transitory storage medium as claimed in claim 7, wherein the authentication information unit further includes the authentication information indicating whether the functional units are authenticated;

in the second verification step, whether said one of the functional units is authenticated is also determined based on the authentication information in the authentication information unit; and in the login information providing step, the login information is provided to said one of the functional units if said one of the functional units is also determined to be authenticated in the second verification step.

9. The non-transitory storage medium as claimed in claim 7, wherein the image forming method further includes a login information obtaining step, performed by the authentication key providing unit in response to a request from said one of the functional units, of obtaining the login information from the authentication information unit; and in the authentication key obtaining step, the login information is obtained instead of the authentication key from the authentication key providing unit.

\* \* \* \* \*